United States Patent
Shen et al.

(10) Patent No.: US 11,968,999 B2
(45) Date of Patent: Apr. 30, 2024

(54) USE AND COMPOSITION OF BUFFER FORMULATION WITH MULTIPLE PH VALUES AND PROTEIN DIGESTION ENHANCER

(71) Applicant: ECO-GEO BIO-TECHNOLOGY COMPANY LIMITED, Taipei (TW)

(72) Inventors: Ta-Lu Shen, Taipei (TW); Fu-An Chen, Taipei (TW)

(73) Assignee: ECO-GEO BIO-TECHNOLOGY COMPANY LIMITED, Taipei (TW)

( * ) Notice: Subject to any disclaimer, the term of this patent is extended or adjusted under 35 U.S.C. 154(b) by 0 days.

(21) Appl. No.: 17/820,414

(22) Filed: Aug. 17, 2022

(65) Prior Publication Data

US 2022/0386648 A1 Dec. 8, 2022

Related U.S. Application Data

(62) Division of application No. 16/306,754, filed as application No. PCT/CN2018/079343 on Mar. 16, 2018, now abandoned.

(51) Int. Cl.
*A23K 10/28* (2016.01)
*A23C 9/13* (2006.01)

(52) U.S. Cl.
CPC ............ *A23K 10/28* (2016.05); *A23C 9/1322* (2013.01)

(58) Field of Classification Search
CPC ............................... A23K 10/28; A23C 9/1322
See application file for complete search history.

(56) References Cited

U.S. PATENT DOCUMENTS

| 2009/0029006 A1 | 1/2009 | Kageyama et al. |
| 2010/0151084 A1 | 6/2010 | Roy et al. |
| 2011/0027424 A1 | 2/2011 | Campbell et al. |

FOREIGN PATENT DOCUMENTS

| CN | 102048027 A | 5/2011 |
| CN | 102640870 A | 8/2012 |
| CN | 105101969 A | 11/2015 |
| CN | 106562349 A | 4/2017 |

OTHER PUBLICATIONS

International Search Report (and English translation) and Written Opinion received in International Application No. PCT/CN2018/079343, dated Dec. 3, 2018.

(Continued)

*Primary Examiner* — Trevor Love
(74) *Attorney, Agent, or Firm* — Haynes and Boone, LLP; Randall C Brown

(57) ABSTRACT

A composition for enhancing protein digestion is disclosed, which includes at least one acid component, at least one base component and a protein digestion enhancer, wherein the at least one acid component is one selected from a group consisting of an organic acid, a phosphoric acid and a combination thereof, the at least one base component is one selected from a group consisting of an organic base, a phosphate and a combination thereof, the at least one acid component and the at least one base component conjugate with each other to form a buffer formulation, and the protein digestion enhancer is one selected from a group consisting of an ascorbic acid, a salt of the ascorbic acid and a combination thereof.

2 Claims, 7 Drawing Sheets

(56) References Cited

OTHER PUBLICATIONS

Office Action and Search Report (and English translation) received in Taiwanese Application No. 107109165, dated Jan. 2, 2019.
Suiryanrayna, Mocherla V A N, et al., "A Review of the Effects of Dietary Organic Acids Fed to Swine," Journal of Animal Science and Biotechnology, Aug. 7, 2017 (Chinese and English translation).
"Discussion on Adding Organic Acid Products to Pig Feed," 2004 (Chinese and English translation).
Feed & Nutrition Magazine, vol. 5, 1994. (Chinese and English abstract).
Watkins, "Drinking Lemon Juice to Improve Your Digestion", Jan. 15, 2015.
Table of Acids with Ka and pKa Values; Appendix 5 Chem 1A, B, C; Lab Manual for Zumdahl's/Zumdahl's Chemistry $6^{th}$ Edition and Appendix II of Bruice $5^{th}$ Ed.2002, 2 pgs.
Essentials of Human Physiology 2017, Effects of Temperature and pH/Human Physiology, Feb. 24, 2018, The McGraw-Hill Companies, 2003, 2 pgs.
Granato et al., Assessing the ascorbic acid contents in beverages and powdered juices: comparison between the experimental data and the values displayed on the product label, 2012, Rev Inst Adolfo Lutz, 71 (2), 331-6. (Year: 2012).
New Albany Smiles, pH values of Common Beverages, accessed May 17, 2022. (Year: 2022).

USE AND COMPOSITION OF BUFFER FORMULATION WITH MULTIPLE PH VALUES AND PROTEIN DIGESTION ENHANCER

CROSS-REFERENCE TO RELATED APPLICATIONS

This application is a Divisional of U.S. National Phase patent application Ser. No. 16/306,754, filed Dec. 3, 2018, which claims priority to International Patent Application No. PCT/CN2018/079343, filed Mar. 16, 2018, the entire disclosures of which are hereby incorporated herein by reference.

FIELD OF THE INVENTION

The present invention relates to a composition for increasing digestion and/or absorption efficacies in a human being or an animal, specifically to a use and a composition for enhancing the rate of proteolysis of pepsin and trypsin in a broad pH range across acid and base.

BACKGROUND OF THE INVENTION

After proteins enter the digestive tract of a mammal, they are hydrolyzed to polypeptides and amino acids by pepsin of the stomach and trypsin, chymotrypsin, carboxypeptidase in the intestinal fluid, and then, the polypeptides and amino acids are absorbed by the intestinal epithelium.

Gastric juice contains gastric acid and pepsinogen secreted by the stomach wall is activated into pepsin by gastric acid. As food passes through the stomach to the duodenum, in the meantime, the pancreas secretes pancreatic juice through the pancreatic duct to the duodenum, upstream of the small intestine. Trypsinogen of the pancreatic juice is secreted into the duodenum, wherein the trypsinogen is activated into trypsin by enterokinase for hydrolysing proteins to oligopeptides. Trypsin also directly or indirectly activates zymogens including trypsinogen and other inactive digestion enzymes into active enzymes in the intestine.

To enhance the digestion and absorption in the digestive tract and promote the growth of animals, antibiotic growth promoters have been widely used in animal feeds in the animal husbandry industry since the 1950s. However, with the rise of animal health concerns such as drug resistance and drug residue, the European Union has completely banned the use of antibiotics as a feed additive since 2006, and the management of drug-containing feed additives is also becoming increasingly stringent in all countries. In recent years, non-drug additives such as acidulants have been well developed in order to replace antibiotics. Acidulants can only decrease the pH of the feed in the gastrointestinal tract in order to extra activate pepsinogen into pepsin in the beginning stage of gastric juice secretion as the secretion has not yet reached the full operation, thereby the digestion of proteins can become more efficient. However, the acidulant does rapidly reduce the pH of the feed and also the pH of stomach contents, on the other hand, it gradually retards normal secretion of the gastric acid, and is going to have a negative effect of a declination in digestion capability and a growth slowdown of the animals during a long-term use.

In view of the above-mentioned drawbacks of the existing antibiotic growth promoters and acidulants, the Applicant of the present application has developed a non-drug additive for increasing digestion and/or absorption efficacies in humans or animals, and the non-drug additive compensates for the defects of the existing products. The summary of the present invention is described below.

SUMMARY OF THE INVENTION

The main object of the present invention is to increase digestion and/or absorption efficacies in humans or animals. In order not to disturb the normal physiology of the gastrointestinal tract, a multiple pHs buffer formulation composition that operates optimally under different pH conditions of the digestive tract is provided in the present invention, and thereby the overall protein digestion and absorption is naturally enhanced.

Different from the existing feed additives, the multiple pHs buffer formulation composition of the present invention can adapt to various pH environments in the gastrointestinal tract, and significantly improve the proteolysis efficiency of the major proteases in the digestive tract under an environment across acid and base (pH 2-7.5). To achieve the above-mentioned effects, the composition of multiple pHs buffer formulation of the present invention includes at least one acid component, at least one base component and a protein digestion enhancer, wherein the at least one acid component is one selected from a group consisting of an organic acid, a phosphoric acid and a combination thereof, the at least one base component is one selected from a group consisting of an organic base, a phosphate and a combination thereof, and the protein digestion enhancer is one selected from a group consisting of an ascorbic acid, a salt of the ascorbic acid and a combination thereof. The acid component and the base component form a buffer formulation so as to steadily sustain the activity of the protein digestion enhancer in the buffer formulation The present invention provides a composition for enhancing protein digestion, which includes at least one acid component, at least one base component and a protein digestion enhancer, wherein the at least one acid component is one selected from a group consisting of an organic acid, a phosphoric acid and a combination thereof, the at least one base component is one selected from a group consisting of an organic base, a phosphate and a combination thereof, the at least one acid component and the at least one base component conjugate with each other to form a buffer formulation, and the protein digestion enhancer is one selected from a group consisting of an ascorbic acid, a salt of the ascorbic acid and a combination thereof.

BRIEF DESCRIPTION OF THE DRAWINGS

Other objectives advantages and efficacies of the present invention will be described in detail below taken from the preferred embodiments with reference to the accompanying drawings.

DETAILED DESCRIPTION OF THE PREFERRED EMBODIMENTS

Figure 1:
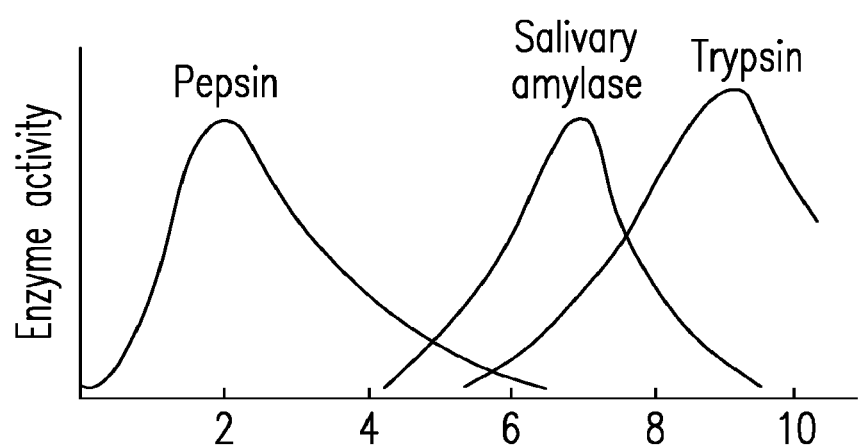
FIG. 1 shows the effect of pH on the activities of three digestive enzymes in the gastrointestinal tract.

When the multiple pHs buffer formulation composition of the present invention is designed, the pH environment of the gastrointestinal tract should be taken into consideration. Please refer to FIG. 1, which is described in Essentials of Human Physiology (2017). As shown in FIG. 1, each of the three main digestive enzymes in the gastrointestinal tract has its own optimal pH environment. For example, pepsin has the optimal activity at pH around 2, and trypsin has the optimal activity at pH around 8. In fact, in the digestion process of the gastrointestinal tract, the pH of the food varies rather than being constant. When the food enters the upper part of the stomach, its pH is about 4.0 to 6.5, and when it enters the lower part of the stomach, its pH is about 1.5 to 4.0. Similarly, the pH of the various parts of the small intestine are also different. The pH is about 7.0 to 8.5 in the duodenum, and the pH is about 4.0 to 7.0 in the other sections of the small intestine. Although there is a better proteolysis efficiency in the optimum pH environment of pepsin and trypsin, the overall digestion and absorption function of the protein can be enhanced if the proteolytic efficiency of pepsin and trypsin in the digestive tract can be improved across acid and base (pH 2~7.5), especially at the pH 5~6 when the optimal pH environment has not yet been achieved or in individuals who have insufficient secretion of gastric acid (such as newborn babies, the elderly and weaned piglets).

The buffer formulation composition provided in the present invention includes at least one acid component, at least one base component, and a protein digestion enhancer. Because the buffer formulation composition of the present invention can be applied to protein nutritional supplements for humans or animals, the components used in the buffer formulation must be non-toxic to the organism. Therefore, the acid component is preferably an organic acid, the base component is preferably an organic base, and the protein digestion enhancer is ascorbic acid, the salts of the ascorbic acid, or combinations thereof. In addition, as phosphoric acid and phosphates are widely used as food additives, therefore, they are also encompassed by the scope of the acid component and base component of the present invention.

The acid component has a conjugate relationship with the base component to form a buffer formulation, e.g., the buffer formulation may be formulated in an organic acid and its conjugate base, or an organic base and its conjugate acid. The pH value of the buffer formulation is determined by the dissociation constant (pKa) of the acid component and the ratio of the acid component to the base component. In general, the pH value is in the range of ±1 pKa. The pKa values of common organic acids, phosphoric acid, and ascorbic acid are shown in Table 1 (see Lab Manual for Zumdahl/Zumdahl's Chemistry 6th Edition). Among these acid components, citric acid has three different pKa values and is an organic acid, and therefore it is the best choice for the acid component in the buffer formulation of the present invention.

TABLE 1

| Organic acids | Number of carbon | pKa1 | pKa2 | pKa3 |
|---|---|---|---|---|
| (1) formic acid | 1 carbon atom | 3.75 | — | — |
| (2) acetic acid | 2 carbon atoms | 4.76 | — | — |
| (3) propionic acid | 3 carbon atoms | 4.88 | — | — |
| (4) butyric acid | 4 carbon atoms | 4.82 | — | — |
| (5) malic acid | 4 carbon atoms | 3.4 | 5.1 | — |
| (6) fumaric acid | 4 carbon atoms | 3.02 | 4.38 | — |
| (7) lactic acid | 3 carbon atoms | 3.83 | — | — |
| (8) citric acid | 6 carbon atoms | 3.13 | 4.76 | 6.4 |
| (9) ascorbic acid | 6 carbon atoms | 4.1 | 11.8 | — |
| (10) phosphoric acid | 0 carbon atom | 2.12 | 7.21 | 12.32/12.66 |

The buffer formulation formed by the appropriate acid component and base component can have multiple pHs, so it can adapt to the changes in the gastrointestinal environment to have the protein digestion enhancer better perform in the gastrointestinal tract.

The acid component used in the present invention includes formic acid, acetic acid, propionic acid, butyric acid, malic acid, fumaric acid, lactic acid, citric acid and phosphoric acid. Preferably, the acid component is an organic acid. In a preferred embodiment, the organic acid is the citric acid. The base component used in the present invention is an organic base or phosphate, preferably, the organic base or the phosphate refers to an alkali metal salt or an alkaline earth metal salt. In a preferred embodiment, the organic base is sodium citrate or potassium citrate.

The buffer formulation of the present invention may also include a plurality of organic acids and their conjugated bases, or a plurality of organic bases and their conjugated acids. The organic acid may also be combined with the phosphoric acid as the acid component in the buffer formulation of the present invention, and the organic base may also be combined with the phosphate as the base component in the buffer formulation of the present invention. Any buffer formulation that can be formulated as being suitable for gastrointestinal pH conditions is within the scope of the present invention.

The protein digestion enhancer used in the present invention is an ascorbic acid, a salt of the ascorbic acid or a combination thereof. Preferably, the salt of the ascorbic acid is one of a sodium salt, a potassium salt, a calcium salt, a magnesium salt or a combination thereof.

The ascorbic acid (L-ascorbic acid), also known as vitamin C, is a water-soluble and easily absorbed compound. The ascorbic acid is easily degraded in an environment where the pH is greater than 4. The buffer formulation of the present invention can steadily maintain the activity of ascorbic acid, the salts of the ascorbic acid, or a combination thereof in the environment at pH greater than 4, so as to achieve the goal of enhancing the proteolytic efficiencies of pepsin and trypsin in the environment across acid and base.

In another aspect, the composition of the present invention can be used as a composition for enhancing protein digestion, e.g., an additive of the protein nutritional supplement such as a formulated milk powder or an animal feed, which enhances the proteolytic efficiencies of pepsin and trypsin in the environment with a pH of 2~7.5, and preferably, significantly enhances the proteolytic efficiencies of pepsin and trypsin in the environment at pH of 5~6.

According to the present invention, the above-mentioned composition includes at least one acid component, at least one base component and a protein digestion enhancer, wherein the at least one acid component and the at least one base component form a buffer formulation, and the buffer formulation enables the protein digestion enhancer to maintain high activity in an environment across acid and base. In one embodiment, the protein digestion enhancer is distributed in the buffer formulation. In another embodiment, the buffer formulation is evenly mixed with the protein digestion enhancer.

In the present invention, the protein digestion enhancer is ascorbic acid, its sodium salt, potassium salt, calcium salt, magnesium salt or a combination thereof. In a preferred embodiment, the protein digestion enhancer is ascorbic acid, especially L-ascorbic acid, which has a concentration ranges from 60 ppm to 1000 ppm. Preferably, the concentration of the ascorbic acid ranges from 60 ppm to 240 ppm, and more preferably 240 ppm. Of course, the concentration of the ascorbic acid of the present invention may be higher as long as it meets the recommended daily intake for the human body (up to about 2 g per day).

According to the present invention, the dosage form of the above-mentioned composition includes powder, particle, tablet, micron-particle, liquid or capsule. Preferably, the composition is manufactured as a delayed or extended-release formula.

EMBODIMENTS

I. Experimental Methods

1. Experiment of the Proteolysis of Casein by Pepsin (pH=2.0)

1.1 Control groups: Prepare four control solutions containing casein (3.85 mg/mL) and pepsin (385 ppm) in pH 2.0 citric acid buffer solution and put them into four test tubes. The four test tubes were respectively incubated at 37° C. for 10 minutes, 1 hour, 2 hours and 3 hours, an equal amount of 10% trichloroacetic acid (TCA) solution was added into each test tube and mixed with the control solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL o-phthalaldehyde (OPA) reagent was added into each new test tube and held for 2 minutes, and the fluorescence intensity was measured at EX. 340 nm and EM. 455 nm by a fluorescence spectrometer. The obtained fluorescence intensity was calculated as the amount of tyrosine according to a tyrosine calibration line established in advance at the same pH value, and represented as total amino acid equivalent (TAAE, μg/mL)

1.2 Experimental groups (60 ppm ascorbic acid): Prepare four experimental solutions containing casein (3.85 mg/mL), 60 ppm ascorbic acid and pepsin (385 ppm) in pH 2.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL).

1.3 Experimental groups (120 ppm ascorbic acid): Prepare four experimental solutions containing casein (3.85 mg/mL), 120 ppm ascorbic acid and pepsin (385 ppm) in pH 2.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL).

1.4 Experimental groups (240 ppm ascorbic acid): Prepare four experimental solutions containing casein (3.85 mg/mL), 240 ppm ascorbic acid and pepsin (385 ppm) in pH 2.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL).

2. Experiment of the Proteolysis of Casein by Pepsin (pH=5.0)

2.1 Control groups: Prepare four control solutions containing casein (3.85 mg/mL) and pepsin (385 ppm) in pH 5.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the control solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to a tyrosine calibration line established in advance at the same pH value, and represented as TAAE (μg/mL).

2.2 Experimental groups (60 ppm ascorbic acid): Prepare four experimental solutions containing casein (3.85 mg/mL), 60 ppm ascorbic acid and pepsin (385 ppm) in pH 5.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL).

2.3 Experimental groups (120 ppm ascorbic acid): Prepare four experimental solutions containing casein (3.85 mg/mL), 120 ppm ascorbic acid and pepsin (385 ppm) in pH 5.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL).

2.4 Experimental groups (240 ppm ascorbic acid): Prepare four experimental solutions containing casein (3.85 mg/mL), 240 ppm ascorbic acid and pepsin (385 ppm) in pH 5.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL).

3. Experiment of the Proteolysis of Casein by Pepsin (pH=6.0)

3.1 Control groups: Prepare four control solutions containing casein (3.85 mg/mL) and pepsin (385 ppm) in pH 6.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the control solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to a tyrosine calibration line established in advance at the same pH value, and represented as TAAE (μg/mL).

3.2 Experimental groups (60 ppm ascorbic acid): Prepare four experimental solutions containing casein (3.85 mg/mL), 60 ppm ascorbic acid and pepsin (385 ppm) in pH 6.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL).

3.3 Experimental groups (120 ppm ascorbic acid): Prepare four experimental solutions containing casein (3.85 mg/mL), 120 ppm ascorbic acid and pepsin (385 ppm) in pH 6.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL).

3.4 Experimental groups (240 ppm ascorbic acid): Prepare four experimental solutions containing casein (3.85 mg/mL), 240 ppm ascorbic acid and pepsin (385 ppm) in pH 6.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL).

4. Experiment of the Proteolysis of Casein by Trypsin (pH=5.0)

4.1 Control groups: Prepare four control solutions containing casein (3.85 mg/mL) and trypsin (385 ppm) in pH 5.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the control solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL).

4.2 Experimental groups (60 ppm ascorbic acid): Prepare four control solutions containing casein (3.85 mg/mL), 60 ppm ascorbic acid and trypsin (385 ppm) in pH 5.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the control solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL)

4.3 Experimental groups (120 ppm ascorbic acid): Prepare four experimental solutions containing casein (3.85 mg/mL), 120 ppm ascorbic acid and trypsin (385 ppm) in pH 5.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL).

4.4 Experimental groups (240 ppm ascorbic acid): Prepare four experimental solutions containing casein (3.85 mg/mL), 240 ppm ascorbic acid and trypsin (385 ppm) in pH 5.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL).

5. Experiment of the Proteolysis of Casein by Trypsin (pH=6.0)

5.1 Control groups: Prepare four control solutions containing casein (3.85 mg/mL) and trypsin (385 ppm) in pH 6.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the control solution uniformly, and the test tubes were held at room temperature for 10 minutes and then centrifuged at 3000 rpm for 10 minutes. 20 μL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL).

5.2 Experimental groups (60 ppm ascorbic acid): Prepare four control solutions containing casein (3.85 mg/mL), 60 ppm ascorbic acid and trypsin (385 ppm) in pH 6.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the control solution uniformly, and the test tubes were held at room temperature for 10 minutes and then centrifuged at 3000 rpm for 10 minutes. 20 µL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (µg/mL).

5.3 Experimental groups (120 ppm ascorbic acid): Prepare four experimental solutions containing casein (3.85 mg/mL), 120 ppm ascorbic acid and trypsin (385 ppm) in pH 6.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 µL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (µg/mL).

5.4 Experimental groups (240 ppm ascorbic acid): Prepare four experimental solutions containing casein (3.85 mg/mL), 240 ppm ascorbic acid and trypsin (385 ppm) in pH 6.0 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 µL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (µg/mL).

6. Experiment of the Proteolysis of Casein by Trypsin (pH=7.5)

6.1 Control groups: Prepare four control solutions containing casein (3.85 mg/mL) and trypsin (385 ppm) in pH 7.5 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the control solution uniformly, and the test tubes were held at room temperature for 10 minutes and then centrifuged at 3000 rpm for 10 minutes. 20 µL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (µg/mL).

6.2 Experimental groups (60 ppm ascorbic acid): Prepare four control solutions containing casein (3.85 mg/mL), 60 ppm ascorbic acid and trypsin (385 ppm) in pH 7.5 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the control solution uniformly, and the test tubes were held at room temperature for 10 minutes and then centrifuged at 3000 rpm for 10 minutes. 20 µL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (µg/mL)

6.3 Experimental groups (120 ppm ascorbic acid): Prepare four experimental solutions containing casein (3.85 mg/mL), 120 ppm ascorbic acid and trypsin (385 ppm) in pH 7.5 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 µL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (µg/mL).

6.4 Experimental groups (240 ppm ascorbic acid): Prepare four experimental solutions containing casein (3.85 mg/mL), 240 ppm ascorbic acid and trypsin (385 ppm) in pH 7.5 citric acid buffer solution and put them into four test tubes. The four test tubes were respectively incubated at 37° C. for 10 minutes, 1 hour, 2 hours and 3 hours, an equal amount of 10% TCA solution was added into each test tube and mixed with the experimental solution uniformly, and the test tubes were held at room temperature for 10 minutes and then centrifuged at 3000 rpm for 10 minutes. 20 µL of the supernatants taken from the above-mentioned test tubes at four time points were put into four new test tubes. 2.4 mL OPA reagent was added into each new test tube and held for 2 minutes, and the fluorescence intensity was measured at EX. 340 nm and EM. 455 nm by the fluorescence spectrometer. The obtained fluorescence intensity was calculated as the amount of tyrosine according to the tyrosine calibration line established in advance at the same pH value, and represented as TAAE (μg/mL).

Results

Figure 2A:
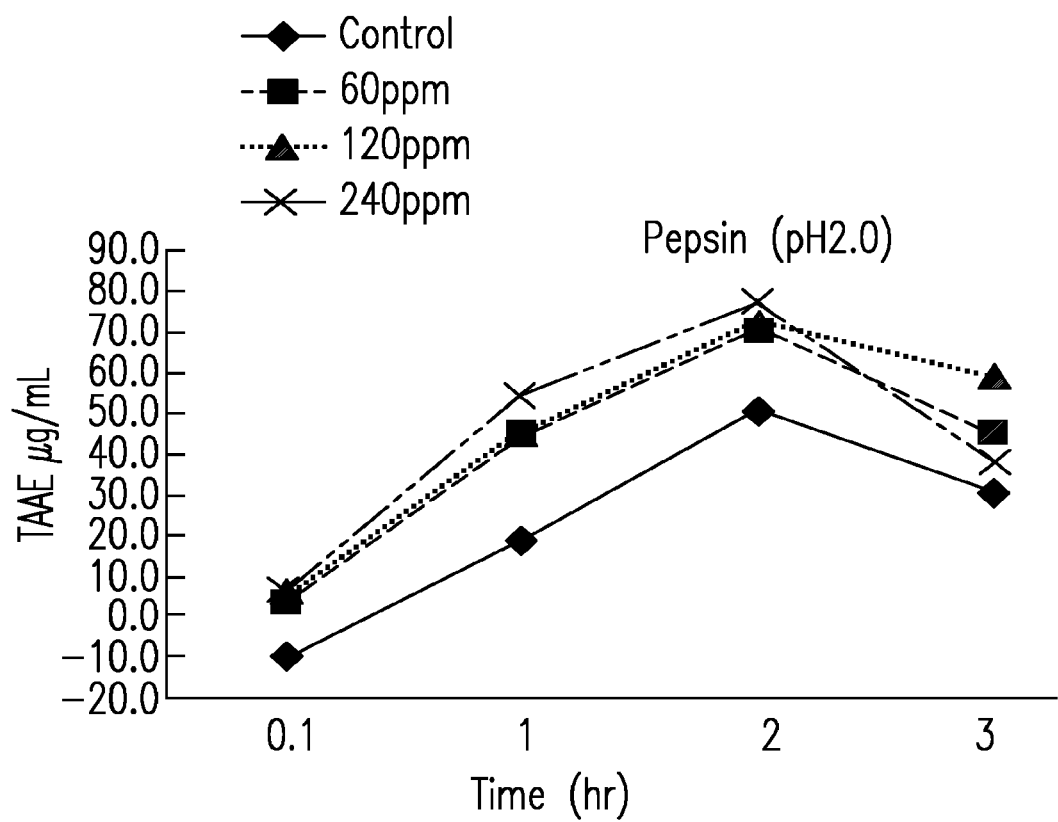
FIG. 2A is a curve diagram showing the proteolytic efficiencies of pepsin (control group) and experimental groups containing different concentrations of ascorbic acid measured at 10 minutes, 1 hour, 2 hours, and 3 hours at pH 2.0.

Please refer to Table 2 and FIG. 2A, which show the proteolytic efficiencies of pepsin (control group) and experimental groups containing different concentrations of ascorbic acid at pH 2.0. Because the optimal environment for the pepsin is at pH 2.0, there is no significant difference in the hydrolysis efficiencies among every group, but it can still be seen that the groups containing ascorbic acid have better hydrolysis efficiencies than the control group.

TABLE 2

| pH 2.0 | Group | Time (hr) | | | |
|---|---|---|---|---|---|
| | | 0.1 | 1 | 2 | 3 |
| Pepsin | Control | −9.8[a] | 19.3 | 50.6 | 30.7 |
| Pepsin + ascorbic acid | 60 ppm | 3.8 | 44.9 | 70.9 | 44.9 |
| | 120 ppm | 6.7 | 45.1 | 73.0 | 58.7 |
| | 240 ppm | 5.6 | 54.6 | 76.4 | 38.2 |

Figure 2B:
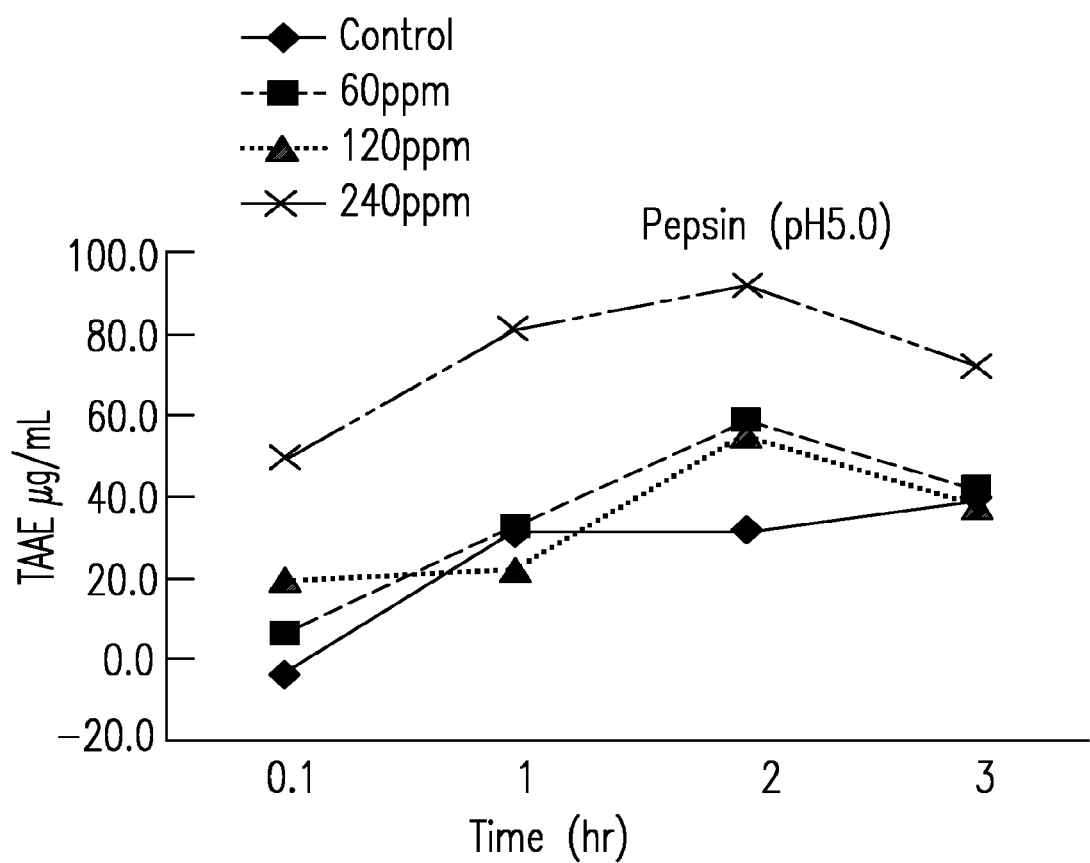
FIG. 2B is a curve diagram showing the proteolytic efficiencies of pepsin (control group) and experimental groups containing different concentrations of ascorbic acid measured at 10 minutes, 1 hour, 2 hours, and 3 hours at pH 5.0.

[a]the numbers shown in the above table are represented as total amino acid equivalent (TAAE) μg/mL Please refer to Table 3 and FIG. 2B, which show the proteolytic efficiencies of pepsin (control group) and experimental groups containing different concentrations of ascorbic acid at pH 5.0. Because the pepsin is not in the optimal environment as at pH 5.0, the proteolytic efficiency of the pepsin is lower under this environment, but it can be seen that 240 ppm of the ascorbic acid improves the proteolytic efficiency of the pepsin significantly.

TABLE 3

| pH 5.0 | Group | Time (hr) | | | |
|---|---|---|---|---|---|
| | | 0.1 | 1 | 2 | 3 |
| Pepsin | Control | −3.6[a] | 31.1 | 31.5 | 38.9 |
| Pepsin + ascorbic acid | 60 ppm | 6.4 | 32.7 | 58.6 | 42.0 |
| | 120 ppm | 19.5 | 22.1 | 55.4 | 38.1 |
| | 240 ppm | 49.5 | 81.1 | 92.2 | 72.6 |

[a]the numbers shown in the above table are represented as TAAE (μg/mL)

Figure 2C:
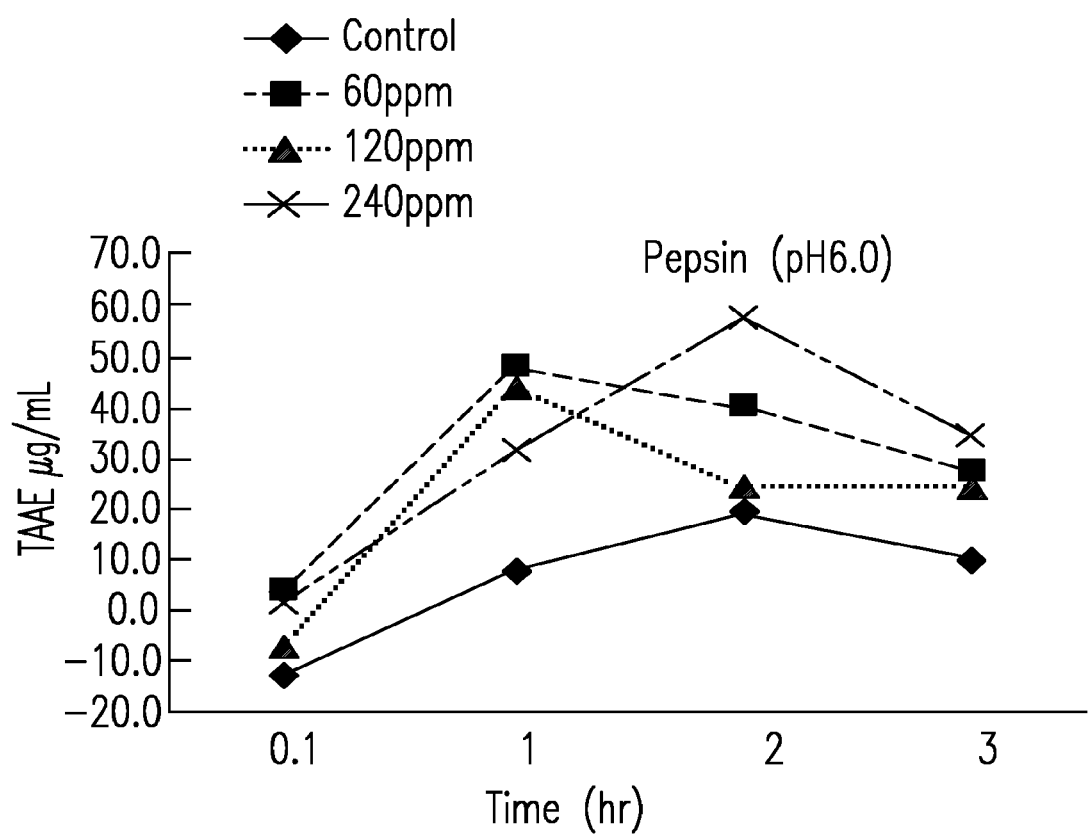
FIG. 2C is a curve diagram showing the proteolytic efficiencies of pepsin (control group) and experimental groups containing different concentrations of ascorbic acid measured at 10 minutes, 1 hour, 2 hours, and 3 hours at pH 6.0.

Please refer to Table 4 and FIG. 2C, which show the proteolytic efficiencies of pepsin (control group) and experimental groups containing different concentrations of ascorbic acid at pH 6.0. The pepsin is also not in the optimal environment as at pH 6.0, but it can be seen that the experimental groups containing the ascorbic acid have better proteolytic efficiencies than the control group.

TABLE 4

| pH 6.0 | Group | Time (hr) | | | |
|---|---|---|---|---|---|
| | | 0.1 | 1 | 2 | 3 |
| Pepsin | control | −12.8[a] | 7.8 | 19.3 | 10.1 |
| Pepsin + ascorbic acid | 60 ppm | 4.2 | 47.9 | 40.4 | 27.5 |
| | 120 ppm | −6.7 | 43.9 | 24.4 | 24.2 |
| | 240 ppm | 1.8 | 31.5 | 57.4 | 34.5 |

[a]the numbers shown in the above table are represented as TAAE (μg/mL)

Figure 3A:
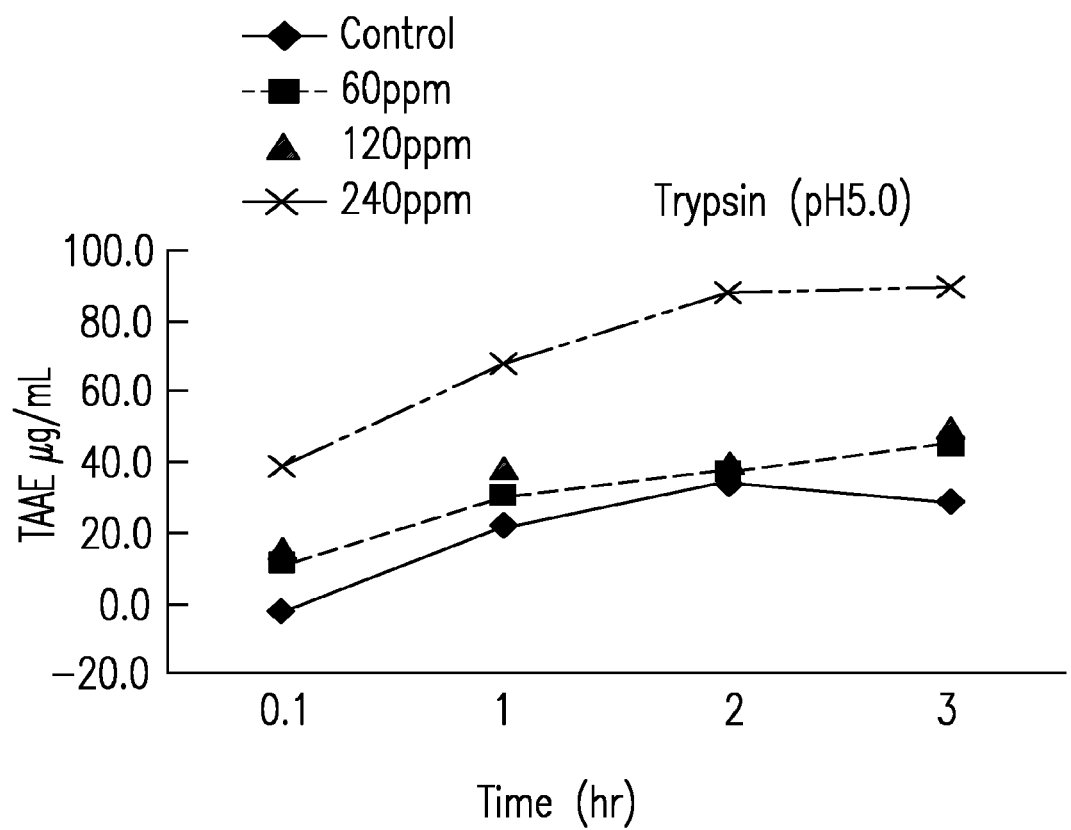
FIG. 3A is a curve diagram showing the proteolytic efficiencies of trypsin (control group) and experimental groups containing different concentrations of ascorbic acid measured at 10 minutes, 1 hour, 2 hours, and 3 hours at pH 5.0.

Please refer to Table 5 and FIG. 3A, which show the proteolytic efficiencies of trypsin (control group) and experimental groups containing different concentrations of ascorbic acid at pH 5.0. Because the trypsin is not in the optimal environment as at pH 5.0, the proteolytic efficiency of the trypsin is lower under this environment, but it can be seen that 240 ppm of the ascorbic acid improves the proteolytic efficiency of the trypsin significantly.

TABLE 5

| pH 5.0 | Group | Time (hr) | | | |
|---|---|---|---|---|---|
| | | 0.1 | 1 | 2 | 3 |
| Trypsin | Control | −2.2[a] | 22.3 | 34.3 | 29.0 |
| Trypsin + ascorbic acid | 60 ppm | 11.5 | 30.4 | 37.8 | 45.2 |
| | 120 ppm | 15.3 | 38.0 | 39.0 | 49.1 |
| | 240 ppm | 38.9 | 37.5 | 87.9 | 89.3 |

[a]the numbers shown in the above table are represented as TAAE (μg/mL)

Figure 3B:
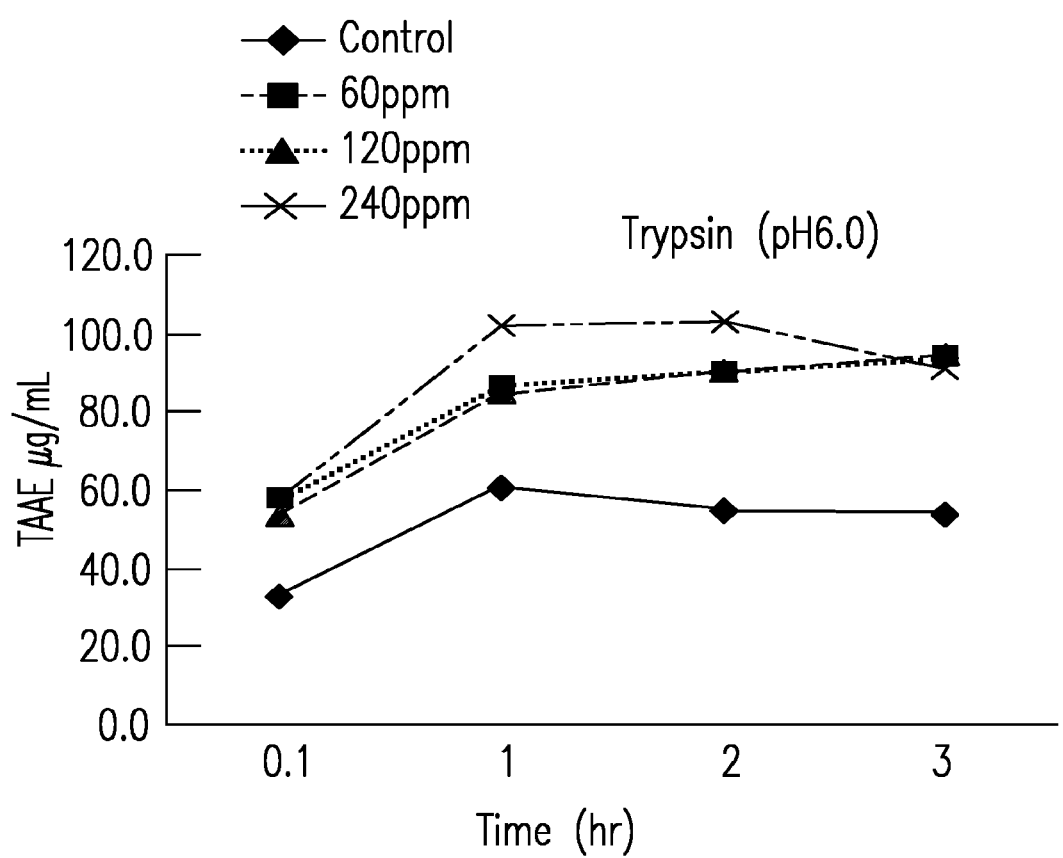
FIG. 3B is a curve diagram showing the proteolytic efficiencies of trypsin (control group) and experimental groups containing different concentrations of ascorbic acid measured at 10 minutes, 1 hour, 2 hours, and 3 hours at pH 6.0.

Please refer to Table 6 and FIG. 3B, which show the proteolytic efficiencies of trypsin (control group) and experimental groups containing different concentrations of ascorbic acid at pH 6.0. The trypsin is also not in the optimal environment as at pH 6.0, but it can be seen that the experimental groups containing the ascorbic acid have better proteolytic efficiencies than the control group.

TABLE 6

| pH 6.0 | Group | Time (hr) | | | |
|---|---|---|---|---|---|
| | | 0.1 | 1 | 2 | 3 |
| Trypsin | Control | 33.1[a] | 60.9 | 55.0 | 54.0 |
| Trypsin + ascorbic acid | 60 ppm | 57.7 | 86.6 | 90.4 | 93.7 |
| | 120 ppm | 54.2 | 85.6 | 91.3 | 94.8 |
| | 240 ppm | 57.9 | 102.4 | 103.1 | 91.5 |

[a]the numbers shown in the above table are represented as TAAE (μg/mL)

Figure 3C:
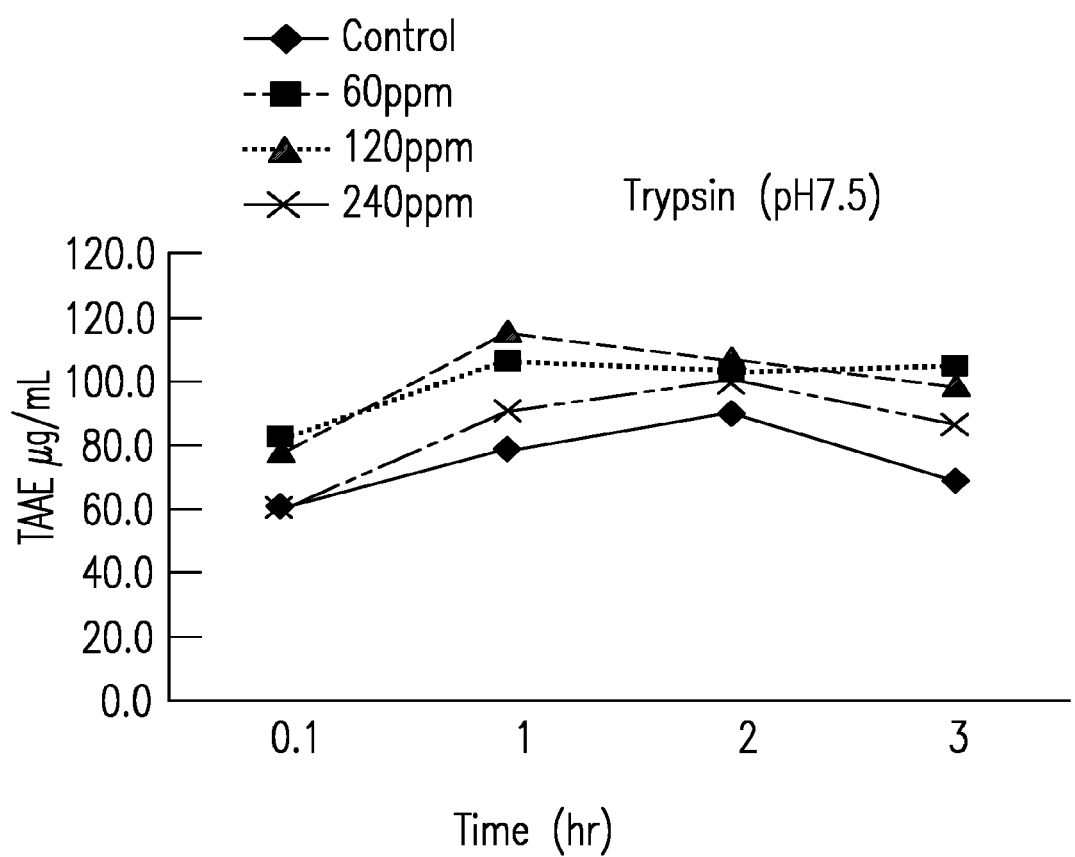
FIG. 3C is a curve diagram showing the proteolytic efficiencies of trypsin (control group) and experimental groups containing different concentrations of ascorbic acid measured at 10 minutes, 1 hour, 2 hours, and 3 hours at pH 7.5.

Please refer to Table 7 and FIG. 3C, which show the proteolytic efficiencies of trypsin (control group) and experimental groups containing different concentrations of ascorbic acid at pH 7.5. Because the optimal environment for the trypsin is at pH 7.5, there is no significant difference in the hydrolysis efficiencies among every group, but it can still be seen that the groups containing ascorbic acid have better hydrolysis efficiencies than the control group.

TABLE 7

| pH 7.5 | Group | Time (hr) | | | |
|---|---|---|---|---|---|
| | | 0.1 | 1 | 2 | 3 |
| Trypsin | Control | 61.5[a] | 79.1 | 90.4 | 69.0 |
| Trypsin + ascorbic acid | 60 ppm | 82.6 | 107.0 | 103.8 | 105.1 |
| | 120 ppm | 78.4 | 116.3 | 107.3 | 99.0 |
| | 240 ppm | 60.4 | 91.1 | 100.5 | 86.8 |

[a]the numbers shown in the above table are represented as TAAE (μg/mL)

While comparing the relative concentrations of the environment of various pH values, it is found that the measured concentration of amino acid is the highest in the optimal environment, and the concentration gradually decreases with the worsening of the environmental conditions, whether the pepsin or the trypsin. Under the environment of pH 2~6, it was observed that the ascorbic acid has a significant effect on the proteolysis efficiency of the pepsin under the environments of pH 5, pH 6 and pH 2, where the control group with the optimum pH (pH 2) was used as a comparison indicator. Under the environments of pH 5~7.5, it was observed that the ascorbic acid has a significant effect on the proteolysis efficiency of the trypsin at the environments of pH 5, pH 6 and pH 7.5, where of the control group with the optimum pH (pH 7.5) was used as a comparison indicator.

Because the composition of the present invention does not contain any drug component, it can be used without the doubt in drug resistance, drug-residue and the concern for food safety.

It is understood, that this invention is not limited to the particular embodiments disclosed, but is intended to cover all modifications which are within the spirit and scope of the invention as defined by the appended claims, the above description, and/or shown in the attached drawings.

What is claimed is:

1. A method for increasing at least one of digestion and absorption efficacies, the method comprising steps of:
   providing a composition including an acid component, a base component and a protein digestion enhancer, wherein the acid component is a citric acid, the base component is a sodium citrate, the acid component and the base component conjugate with each other to form a buffer formulation having a pH of 5 to 7.5, and the protein digestion enhancer is an ascorbic acid having a concentration of 60-240 ppm; and
   administering the composition to one of a human being and an animal to increase at least one of digestion and absorption efficacies of a pepsin in an environment with a pH of 5 to 6 or a trypsin in an environment with a pH of 5 to 7.5.

2. The method as claimed in claim 1, wherein the ascorbic acid is an L-ascorbic acid.

\* \* \* \* \*